No. 809,336. PATENTED JAN. 9, 1906.
H. S. SWANSON.
SINGLE ROW CULTIVATOR.
APPLICATION FILED AUG. 29, 1905.
2 SHEETS—SHEET 1.
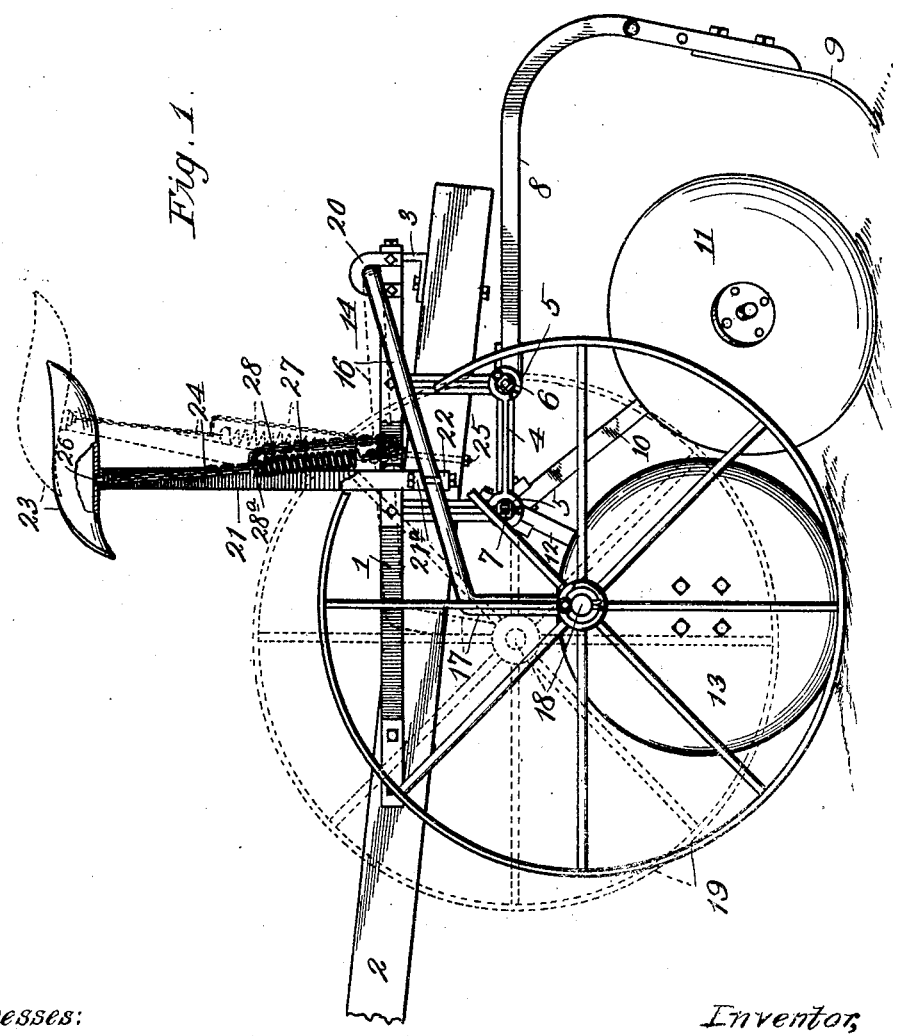
Witnesses:
R E Hamilton
J. Morrs
Inventor,
Herman S. Swanson
By F. G. Fischer
Atty.

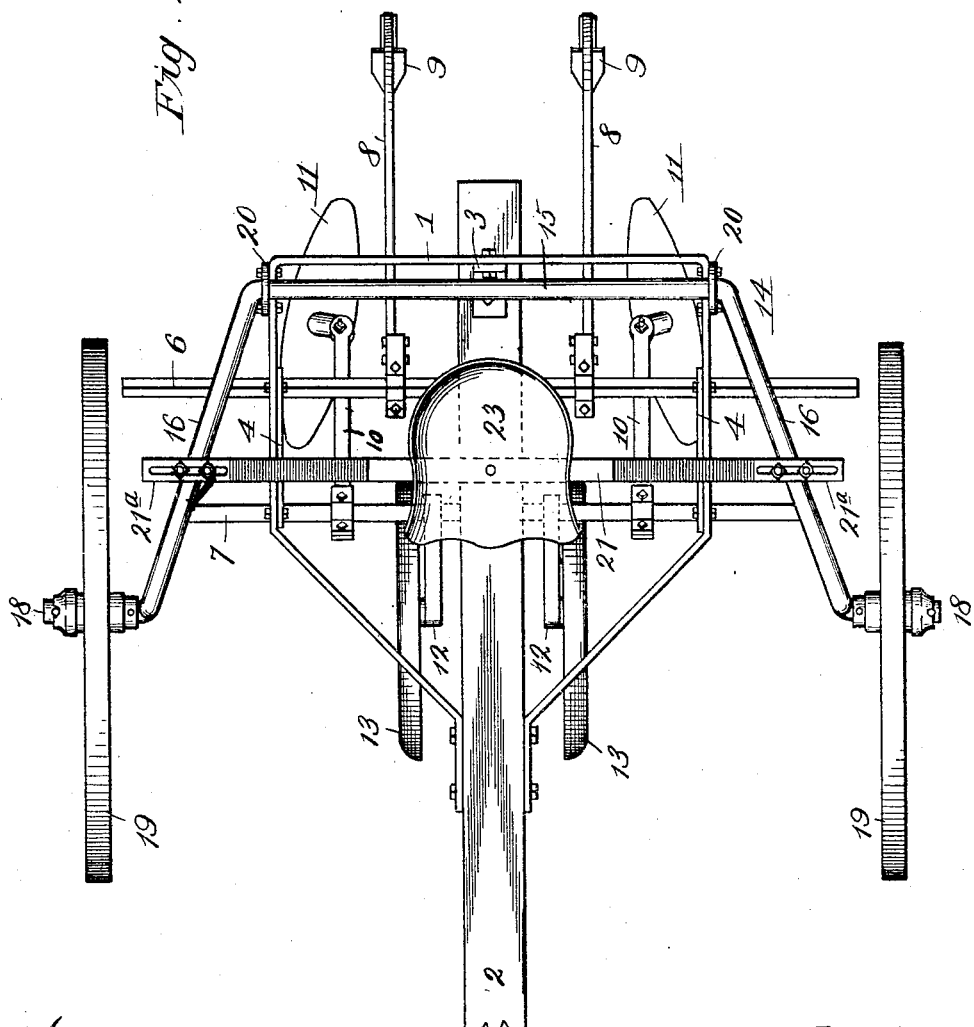

UNITED STATES PATENT OFFICE.

HERMAN S. SWANSON, OF SHENANDOAH, IOWA.

SINGLE-ROW CULTIVATOR.

No. 809,336.     Specification of Letters Patent.     Patented Jan. 9, 1906.

Application filed August 29, 1905. Serial No. 276,229.

*To all whom it may concern:*

Be it known that I, HERMAN S. SWANSON, a citizen of the United States, residing at Shenandoah, in the county of Page and State of Iowa, have invented certain new and useful Improvements in Single-Row Cultivators, of which the following is a specification.

My invention relates to improvements in single-row cultivators, and relates more particularly to means for balancing single-row cultivators so they will not upset and means for guiding said cultivators over the rows of plants under cultivation.

The invention consists in the novel construction, combination, and arrangement of parts hereinafter described, pointed out in the claims, and illustrated in the accompanying drawings.

Referring now to said drawings, Figure 1 represents a side elevation of a single-row cultivator provided with my improvements, the operation of the latter being shown by dotted lines. Fig. 2 is a plan view of same.

In said drawings, 1 designates a rectangular frame secured at its forward ends to a tongue 2, whereby the machine is drawn forwardly, the rear portion of said tongue being provided with a right-angled plate 3, to which the rear end of the frame is secured.

4 designates a pair of hangers secured to opposite sides of the frame and provided with bearings 5 for the reception of two rocker-bars 6 and 7, respectively.

8 designates a pair of beams adjustably secured at their forward ends to bar 6 and provided at their rear ends with shovels 9.

10 designates a pair of disk-arms adjustably secured at their upper ends to bar 7 and provided at their lower ends with journaled disks 11.

12 designates a pair of wheel-arms adjustably secured at their upper ends to bar 7 and provided at their lower ends with journaled guide-wheels 13, adapted to travel in the furrows between the rows, and thus guide the machine over the plants under cultivation.

14 designates an irregular-shaped crank-axle comprising a transverse portion 15, downwardly and outwardly extending crank-arms 16, communicating at their upper ends with the transverse portion, and approximately vertical portions 17, communicating at their upper ends with the lower terminals of the crank-arms and provided at their lower portions with outturned ends 18, upon which a pair of balancing-wheels 19 are mounted. The transverse portion 15 of the crank-axle is pivotally secured upon the rear portion of frame 1 by a pair of stirrups 20, and the outturned terminals 18 of said crank-axle are arranged approximately in a vertical plane with the axis of guide-wheels 13, so that the machine may be readily turned upon reaching the end of each furrow.

21 designates a seat-bracket adjustably secured at its lower slotted ends 21$^a$ upon the crank-arms 16 by means of clips 22 and provided at its upper portion with a seat 23 for the driver.

24 designates a chain cable attached at its lower terminal to a bolt 25, extending through the tongue, and at its upper end to a bolt 26, securing the seat to the upper portion of bracket 21. Cable 24 has a certain amount of slack 27, to the ends of which a retractile spring 28 is attached.

In practice the machine is guided by guide-wheels 13, traveling in each furrow between the rows, where they are held by the weight of the machine and a portion of the weight of the driver, a portion of the latter's weight also being arranged upon the crank-arms of the axle 14 to prevent said axle from oscillating too freely, and thus endangering the stability of the machine, although the balancing-wheels will be free to move up and down independently of the guide-wheels when traveling over rough ground. The weight of the driver is assisted in resisting the upward movement of the balancing-wheels by the retractile spring 28, which is expanded by said upward movement, as shown in dotted lines, Fig. 1, and before the base of the balancing-wheels attain sufficient elevation above the base of the guide-wheels to permit the machine to upset their upward movement will be checked by the cable 24, the slack portion of which is of sufficient length to permit the balancing-wheels to pass over ordinary obstructions, but becomes taut before the base of said wheels can be raised high enough above the base of the guide-wheels to permit the machine to upset. The slack portion of the chain may be lengthened or shortened by securing any one of the links to the upper hooked end 28$^a$ of spring 28, and as the ends of said chain are adjustably secured to bolts 25 26 the tension of the spring may be readily adjusted by taking up or letting out either end of the chain. Thus downward pressure upon the balancing-wheels may be easily regulated. The weight upon the balancing-wheels may be further controlled by adjusting the seat-bracket either forwardly or backwardly upon the crank-arms.

Having thus described my invention, what I claim, and desire to secure by Letters Patent, is—

1. In a single-row cultivator, a crank-axle pivotally mounted upon the cultivator, balancing-wheels mounted upon the free ends of said crank-axle, yielding means for normally limiting the upward movement of said balancing-wheels, and means for positively limiting said upward movement.

2. In a single-row cultivator, a crank-axle pivotally mounted upon the cultivator, balancing-wheels mounted upon the free ends of said crank-axle, a spring for normally limiting the upward movement of said balancing-wheels, and means for positively limiting said upward movement.

3. In a single-row cultivator, a crank-axle pivotally mounted upon the cultivator, balancing-wheels mounted upon the free ends of said crank-axle, yielding means for normally limiting the upward movement of said balancing-wheels, and a cable for positively limiting said upward movement.

4. In a single-row cultivator, a crank-axle pivotally mounted upon the cultivator, balancing-wheels mounted upon the free ends of said crank-axle, yielding means for normally limiting the upward movement of said balancing-wheels, and adjustable means for positively limiting said upward movement.

5. In a single-row cultivator, a crank-axle pivotally mounted upon the cultivator, balancing-wheels mounted upon the free ends of said crank-axle, adjustable yielding means for normally limiting the upward movement of said balancing-wheels, and means for positively limiting said upward movement.

6. In a single-row cultivator, a crank-axle pivotally mounted upon the cultivator, balancing-wheels mounted upon the free ends of said crank-axle, a member carried by said crank-axle, a cable attached at its ends to the cultivator and said member for positively limiting the upward movement of the balancing-wheels, and yielding means secured to said cable for normally limiting said upward movement.

7. In a single-row cultivator, a pair of guide-wheels upon which said cultivator is mounted, a crank-axle pivotally mounted upon the cultivator, balancing-wheels mounted upon the free ends of said crank-axle, said guide-wheels and balancing-wheels having independent vertical movement, yielding means for normally limiting said independent movement, and means for positively limiting said movement.

8. In a cultivator, the combination with a tongue, a frame mounted thereon, cultivating appliances suitably secured to said frame, and guide-wheels upon which said frame is mounted, of a crank-axle pivotally mounted upon the frame, balancing-wheels mounted upon the free ends of said crank-axle, said guide-wheels and balancing-wheels having independent vertical movement, yielding means for normally limiting said independent movement, and means for positively limiting said movement.

9. In a single-row cultivator, a crank-axle pivotally mounted upon the cultivator, balancing-wheels mounted upon said crank-axle, a seat-bracket mounted upon the crank-axle, a cable attached at its ends to the seat-bracket and the cultivator, and a spring secured at its ends to said cable, substantially as described.

10. In a single-row cultivator, a crank-axle pivotally mounted upon said cultivator, balancing-wheels mounted upon said crank-axle, a seat-bracket adjustably mounted upon said crank-axle, a cable adjustably attached at one end to the seat-bracket and attached at its opposite end to the cultivator, said cable having a suitable amount of slack, and a spring adjustably secured to the ends of said slack portion, substantially as described.

In testimony whereof I affix my signature in the presence of two witnesses.

HERMAN S. SWANSON.

Witnesses:
C. A. WENSTRAUD,
ERNEST M. SWANSON.